No. 658,022. Patented Sept. 18, 1900.
E. C. RIMINGTON.
MAXIMUM ELECTRICAL CURRENT INDICATOR AND RECORDER.
(Application filed May 3, 1900.)

(No Model.)

Witnesses:

Inventor
Ernest Cecil Rimington
by Alexander & Co.
Attorneys

UNITED STATES PATENT OFFICE.

ERNEST CECIL RIMINGTON, OF LONDON, ENGLAND.

MAXIMUM-ELECTRICAL-CURRENT INDICATOR AND RECORDER.

SPECIFICATION forming part of Letters Patent No. 658,022, dated September 18, 1900.

Application filed May 3, 1900. Serial No. 15,359. (No model.)

*To all whom it may concern:*

Be it known that I, ERNEST CECIL RIMINGTON, a subject of the Queen of Great Britain and Ireland, residing at London, England, have invented a new and useful Maximum-Electrical-Current Indicator and Recorder, (for which I have made application for Letters Patent in Great Britain under No. 23,753 and date November 28, 1899,) of which the following is a specification.

This invention relates to a maximum-electrical-current indicator or recorder; and it consists of an apparatus whereby the constant generation of a gas or gases, such as by electrolysis of water by the passing electrical current, is utilized to effect a record of the maximum current that has passed, provided such maximum has had a predetermined duration, so as to avoid registration of a mere accidental and short rise of current.

In many cases of the supply of electrical current to consumers the maximum current required for a definite period has been deemed to be an important factor in the estimation of the charge per unit of current supplied, and in such case a maximum-current-recording indicator is required. The volume of gases liberated in a given time by the electrolysis of a passing current is a reliable indication of the amount of current passing, and instruments upon this basis are extant in which by the inverse measurement of the volume of water left in the electrolytic cell a record is obtained of the total amount of current that has been consumed quantitatively at any time, the gases in this case being allowed to go to waste. I therefore may utilize the gases as generated in a quantitative measuring instrument to operate my maximum-recording apparatus or may as part of my apparatus supply a distinct electrolytic cell, through which passes the current to be estimated as to maximum amount.

Figure 2:
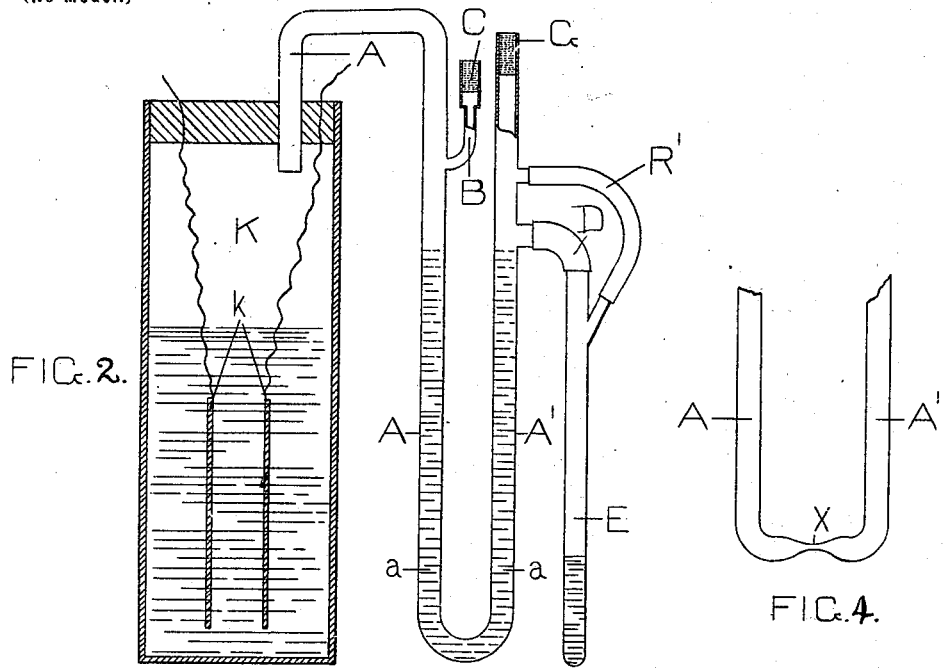
Figure 4:
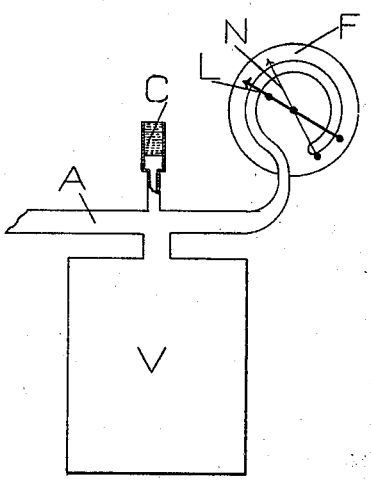
Figure 1:
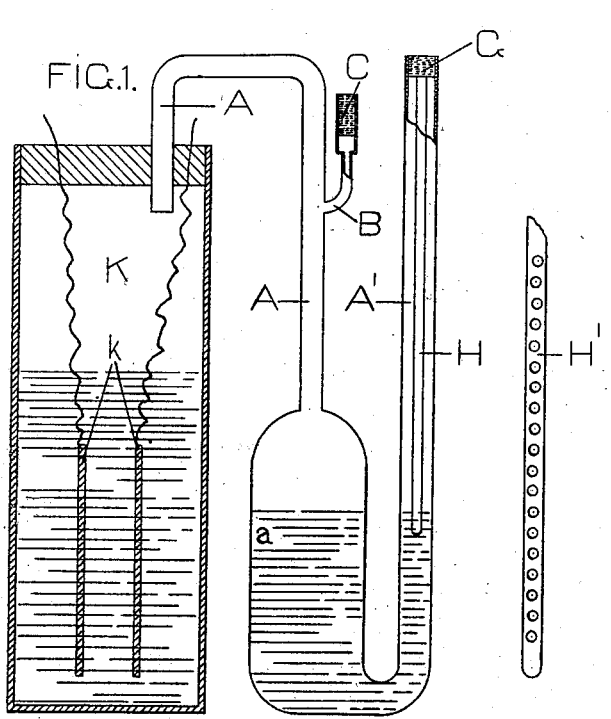
Figure 3:
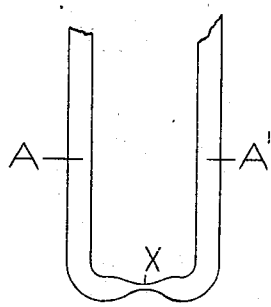

Figure 1 is a sectional elevation of one form of my maximum-indicating apparatus. Fig. 2 is the same with a modified form of recording device. Fig. 3 is a detached detail of modified recording device and time-lag, and Fig. 4 is a detached detail of a further-modified form of time-lag.

K is an electrolytic cell with electrodes $k$ closed, so that all gas generated is forced to pass by the tube A, which is formed as a U-tube with ascending leg A', the lower part of the U-tube being filled with a liquid $a$. In the upper part of the tube A above the liquid $a$ I provide a by-pass B to the atmosphere limited as to its power of permitting the gas to escape by a porous plug C, such as compressed glass wool, or by a pin-hole in a metal-plate plug, or by other equivalent restriction of the passage of gas through such exit. The accumulation of the gas within the cell K and the tube A beyond that which is allowed to escape will thus provide a means by its rising pressure for indication and eventual permanent record by a recording device, hereinafter described, of the maximum current that has passed at any time.

By making the lower descending part of the U-tube larger in diameter than that of the ascending leg A' the rise of the column of liquid $a$ in the leg A' may be multiplied as regards the ratio of descent of the liquid $a$ in the lower part of A under the accumulated gaseous pressure, and a permanent record may be preserved by the staining of a rod H in the said tube A' or the washing off from such rod of a dissolvable color or by pockets formed in the face of a strip of metal H', suspended in the liquid in A', which pockets will retain portions of liquid up to the highest level attained by the liquid. Equivalently, to obtain a permanent record of the maximum rise of the liquid $a$ in the leg A' of the U-tube I may provide an overflow-passage D from the tube A' with a depending pocket-tube E, in which the overflow liquid will collect. To insure perfect and uninterrupted overflow into the pocket-tube E, I find it advisable to add an air by-pass R'. Equivalently, to obtain a permanent record of maximum current I may conduct the tube A, containing the accumulated gas-pressure, direct to a mechanical pressure-gage F, such as the well-known Bourdon-tube gage, and the ordinary indicating-hand L may be caused to push before it a supplementary balanced hand N, mounted upon its pivot with sufficient frictional resistance to rotation to remain at the ultimate point to which it has been pushed by the ordinary indicating-hand L.

In order that any short and accidental rises of the current may not produce any permanent addition to the maximum record, I introduce a time-lag in my recording apparatus between the operative gas and the recording mechanism. This time-lag I may provide in various equivalent ways. First, as in Figs. 1 and 2, I provide a plug G, closing the end of the rising part of the U-tube A', which plug may be porous, such as porous earthenware, or may have a minute pin-hole therethrough, thus retarding the rise of the liquid column in A' for a time until the inclosed air above it gradually escapes. Second, as in Fig. 3, I may provide a closed vessel or chamber V, of considerable capacity, connected to the pipe A, the rise of pressure by accumulation of gas being thus delayed in proportion to the volume of the space that has to be filled by the excess accumulation of gas. Third, as in Fig. 4, I may apply a constriction X anywhere in the tube A', so that the rising column of liquid is caused to pass through a pin-hole and is thus retarded in any tendency to quick movement.

Having now described my said invention, what I claim, and desire to secure by Letters Patent, is—

1. In combination a closed electrolytic cell, an exit-tube for the gases generated by electrolysis, a partially-impeded exit to the atmosphere from said gas-tube, and means connected to closed end of said gas-tube for permanently recording the highest pressure generated by the accumulated gases.

2. In combination a closed electrolytic cell, an exit-tube therefrom for the gases generated by electrolysis, a partially-impeded exit to the atmosphere from said gas-tube; means connected to the closed end of said gas-tube for permanently recording the highest pressure generated by the accumulated gases; and means for retarding the immediate effect of the accumulated gaseous pressure upon the recording device.

3. In combination a closed electrolytic cell, an exit-tube for the gases therefrom, an exit by-pass to atmosphere from the said gas-tube, a porous plug in said by-pass to impede the exit of gases to the atmosphere, a continuation of the gas-tube as a U-tube, a liquid therein, and means for permanently recording the rise of level of said liquid in the ascending leg of said U-tube.

4. In combination a closed electrolytic cell, an exit-tube for the gases therefrom, an impeded exit by-pass to atmosphere from the said gas-tube, a U-bend continuation of gas-tube with liquid therein, and a side issue from ascending leg of U-tube with a pocket tube or trap connected thereto for permanent reception of overflow liquid therein.

In witness whereof I have hereunto set my hand in presence of two witnesses.

ERNEST CECIL RIMINGTON.

Witnesses:
JOHN C. FELL,
RICHARD A. HOFFMANN.